(12) United States Patent
Behrens et al.

(10) Patent No.: US 7,716,221 B2
(45) Date of Patent: May 11, 2010

(54) CONCEPT BASED CROSS MEDIA INDEXING AND RETRIEVAL OF SPEECH DOCUMENTS

(76) Inventors: Clifford A. Behrens, 20 Beverly Rd., Madison, NJ (US) 07940; Dennis E. Egan, 625 Boulevard, Westfield, NJ (US) 07090; Devasis Bassu, 57 Oakwood Village, Apt. 9, Flanders, NJ (US) 07836

( * ) Notice: Subject to any disclaimer, the term of this patent is extended or adjusted under 35 U.S.C. 154(b) by 326 days.

(21) Appl. No.: 11/809,455

(22) Filed: Jun. 1, 2007

(65) Prior Publication Data
US 2007/0299838 A1 Dec. 27, 2007

Related U.S. Application Data

(60) Provisional application No. 60/810,786, filed on Jun. 2, 2006.

(51) Int. Cl.
*G06F 7/00* (2006.01)
*G06F 17/30* (2006.01)
(52) U.S. Cl. .................. 707/736; 707/739; 707/755
(58) Field of Classification Search ............. 707/1–3, 707/5, 6, 100–102, 104.1; 704/9, 254, 255
See application file for complete search history.

(56) References Cited

U.S. PATENT DOCUMENTS

| | | | | |
|---|---|---|---|---|
| 4,839,853 A | | 6/1989 | Deerwester et al. ......... 364/900 |
| 5,301,109 A | * | 4/1994 | Landauer et al. .............. 704/9 |
| 5,893,058 A | * | 4/1999 | Kosaka ..................... 704/254 |
| 5,941,944 A | * | 8/1999 | Messerly ................... 709/203 |
| 5,974,412 A | | 10/1999 | Hazelhurst et al. | |
| 6,289,353 B1 | | 9/2001 | Hazelhurst et al. | |
| 6,615,208 B1 | | 9/2003 | Behrens et al. ................ 707/5 |
| 7,006,969 B2 | * | 2/2006 | Atal ........................ 704/238 |
| 7,124,081 B1 | * | 10/2006 | Bellegarda .................. 704/255 |
| 7,151,942 B1 | * | 12/2006 | Evens et al. ................. 455/458 |
| 7,152,065 B2 | | 12/2006 | Behrens et al. ................ 707/5 |
| 7,475,063 B2 | * | 1/2009 | Datta et al. ................... 707/3 |
| 2002/0156763 A1 | * | 10/2002 | Marchisio ..................... 707/1 |
| 2004/0039657 A1 | | 2/2004 | Behrens et al. ............... 705/26 |
| 2006/0265209 A1 | * | 11/2006 | Bradford ....................... 704/9 |

OTHER PUBLICATIONS

International Search Report for International Application No. PCT/US07/12965.

* cited by examiner

*Primary Examiner*—Don Wong
*Assistant Examiner*—Merilyn P Nguyen
(74) *Attorney, Agent, or Firm*—Fitch, Even, Tabin & Flannery

(57) ABSTRACT

Indexing, searching, and retrieving the content of speech documents (including but not limited to recorded books, audio broadcasts, recorded conversations) is accomplished by finding and retrieving speech documents that are related to a query term at a conceptual level, even if the speech documents does not contain the spoken (or textual) query terms. Concept-based cross-media information retrieval is used. A term-phoneme/document matrix is constructed from a training set of documents. Documents are then added to the matrix constructed from the training data. Singular Value Decomposition is used to compute a vector space from the term-phoneme/document matrix. The result is a lower-dimensional numerical space where term-phoneme and document vectors are related conceptually as nearest neighbors. A query engine computes a cosine value between the query vector and all other vectors in the space and returns a list of those term-phonemes and/or documents with the highest cosine value.

32 Claims, 1 Drawing Sheet

CONCEPT BASED CROSS MEDIA INDEXING AND RETRIEVAL OF SPEECH DOCUMENTS

CROSS-REFERENCE TO RELATED APPLICATIONS

This application claims the benefit of U.S. Provisional Patent Application No. 60/810,786, filed Jun. 2, 2006, which is hereby incorporated herein by reference in its entirety.

FIELD OF THE INVENTION

The present invention relates generally to latent semantic indexing technology. More particularly, the present invention relates to indexing, searching, and retrieving the content of speech documents.

BACKGROUND OF THE INVENTION

Indexing, searching, and retrieving the content of spoken documents (including but not limited to recorded books, audio broadcasts, recorded conversations) is a difficult problem. Current approaches typically enable search and retrieval via the equivalent of keyword matching, either by matching a user-supplied textual query with textual metadata or by phonetic matching after transcribing the query phonetically. This approach yields low recall, i.e., many relevant speech documents may not be found for a query. Instead of keyword matching, we solve this problem by finding and retrieving spoken documents that are related to a query at the conceptual level, even if these documents do not contain the spoken (or textual) query terms.

BRIEF SUMMARY OF THE INVENTION

Existing technologies provide phonetic indexing where the phonetic content of a speech audio document is transcribed to an intermediate language and textual or voice queries are also transcribed to this same intermediate language so that speech segments can be matched to queries. To the contrary, the present invention computes a search space from a new kind of "dual document," comprising a phonetic transcription of a speech document, and its textual transcription. In this approach a dual document is a "bag" that contains two kinds of tokens: words and phonemes. A corpus of these dual documents will be used as a training set to compute a vector space where phonemes, words and documents (speech and text) will be represented by vectors such that those phonemes, words and documents expressing related concepts will be nearest neighbors in this space. Nearest neighbor relationships can be exploited to find and retrieve speech documents for either a text or speech query, or to find and retrieve text documents for a speech query. This will be referred to as "concept-based cross-media information retrieval." One of the attractive features of the invention is that, unlike other methods requiring translation from speech to natural language text for concept-based-indexing content, content is indexed at a more abstract, conceptual level using phonetic transcriptions. This feature reduces both the error rate and cost of indexing speech.

The invention will be more clearly understood when the following description is read in conjunction with the accompanying drawing.

DETAILED DESCRIPTION

Figure 1:
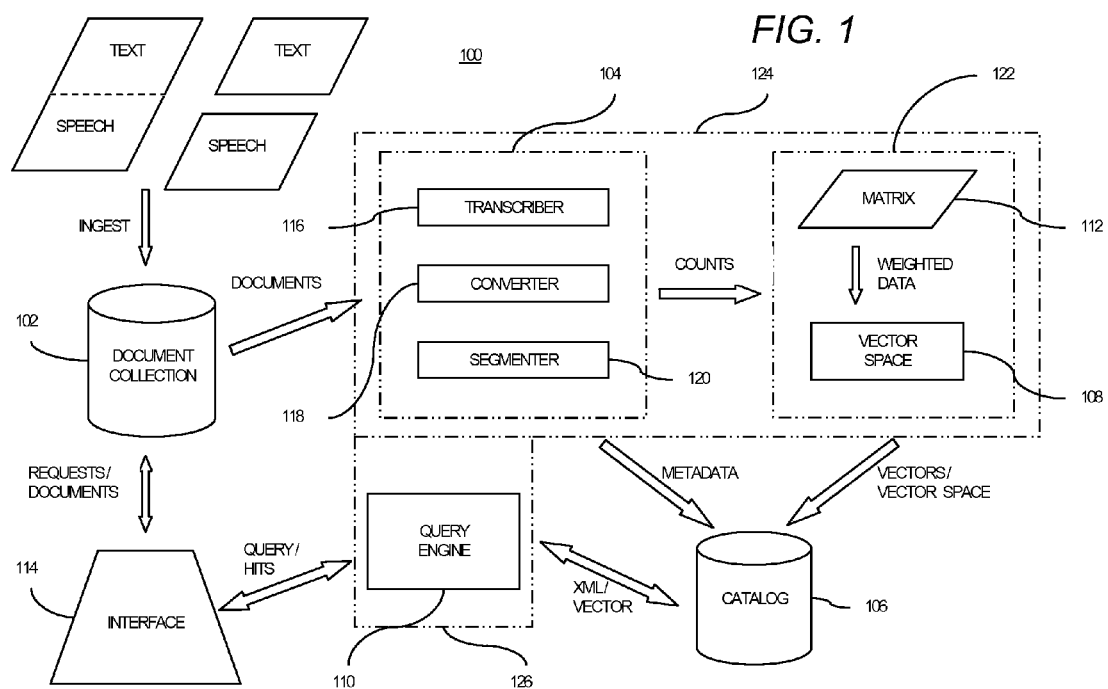
FIG. 1 is a schematic diagram of an embodiment of a semantic indexing system.

Referring to FIG. 1 there is shown schematically an embodiment of the indexing system 100 comprising the present invention. The system includes Ingest/Collect Documents 102, Pre-processor/Register Documents 104, Catalog Documents 106, Augment Catalog (SVD) 108 and Query Engine/Catalog 110. Processing begins when a machine or human places a set of documents in a Document Collection Area 102. A Librarian registers these documents and prepares them for cataloguing. Cataloguing creates a record of metadata, both textual and numeric, for a document in a database, and applies all the additional processing needed to compute a vector space in which all documents, along with their terms and phonemes, are indexed. The catalog may be regularly augmented with new documents by following the same Ingest/Collect-Register-Catalog sequence. However, with catalog augmentation documents are indexed but not used to compute the vector space. Moreover, End Users can regularly query the catalog, its vectors and their associated metadata, for relevant documents. Document registration, cataloguing and querying processes are available as network services. Once these services are started by an Administrator, they are available to their users and to each other. For example, a Register Service notifies a Catalog Service when there are new documents to index. The Librarian has to "trigger" the process flow by registering documents using the GUI 114 provided.

The original source data in accordance with the present invention comprises textual and speech documents; some of these are dual-documents, consisting of a speech document and its corresponding textual transcription, while others are "singletons," i.e., either text or speech documents without corresponding representations in the other format. A means for ingesting and collecting these documents into a content repository is provided. This may merely entail transferring documents into a known collection location, e.g., file directory or folder, where they can be detected by a process that registers new documents.

Document registration creates a record in the content catalog for a document, including creation of metadata such as document type, creation date and location, and queues the document for preprocessing. Several things are accomplished in this preprocessing step. First, all speech documents must be transcribed phonetically 116 into an intermediate representation language. One such automatic phonetic transcriber is Nexidia Enterprise Speech Intelligence® for automatic phonetic transcription. The invention is not limited to this particular phonetic transcriber. Second, a document converter 118 (e.g., the Stellent™ Outside In® product) is used to convert documents from native format to UTF-8, the document encoding required for the concept-based preprocessing. The invention is not limited to this particular document converter. Third, documents are segmented 120, i.e., phonetic transcriptions and their corresponding texts are tokenized so that counts for index terms and phonemes 112 can be obtained. Fourth, documents are enqueued for cataloguing, in this case a document collection catalog.

Further processing requires that a collection distinguish between its training documents and other index-only documents. Training documents are used to compute the concept vector space, while index-only documents are not. In the latter case, vectors are computed 108 and used to augment the catalog. Since the present invention supports cross-media information retrieval, documents should also be segregated by media type, in this case text or speech.

Once all documents in a collection are preprocessed, word/phoneme counts are stored in the collection catalog 106 as part of a document's metadata. From these counts a very large, sparse matrix is constructed where a row is created for each term and each phoneme in the training set, and a column is created for each document in the training set. The entries in this "term-phoneme/document" matrix are the word and phoneme counts, i.e., the number of times a particular indexable word and indexable phoneme appears in a document. Before a vector space can be computed with this matrix, its entries must be normalized. The reason for this requirement is that some documents may be much longer than others, and some terms or phonemes may have a tendency to appear far more often in a document or in a collection than others. Therefore, it is necessary to reduce the effects of document length and high-frequency tokens in the training set. This is accomplished by applying an appropriate weighting to the raw token counts in the term-phoneme/document matrix 112.

As mentioned above, the invention uses a statistical technique known as Singular Value Decomposition (or SVD) 108 to compute a vector space from a term-phoneme/document matrix 112 constructed from a training set of documents. The result produced is a lower-dimensional numerical space where term-phoneme and document vectors that are related conceptually are nearest neighbors. It is this property that allows the finding of terms or documents for a query, even if the documents do not possess any of the query terms; the documents do not have to contain the query, they only need to be nearest neighbors to the query vector in the computed vector space.

Once a vector space has been computed for a training set of documents, it is necessary to compute vectors for new documents, and then add these vectors to the space. This operation merely requires placement of these new documents in a team's collection area also known to the Librarian. Once there, the Librarian can enqueue them for processing by Registering them, as with the training set. Similar to training documents, a record is created in the content catalog which includes a word or phoneme count for each document; however, unlike the training documents these documents are not used to compute a vector space. For folding in purposes, a document can contain only words or only phonemes, not necessarily both. Its vector representation will be computed with its word vectors or phoneme vectors. A vector is created for each document by summing the term or phoneme vectors for words and phonemes the document contains, each term or phoneme vector weighted by its respective word or phoneme count. Once the vectors for these new documents are "folded-in" to the vector space, the documents are available for searching along with documents already there.

Document query entails searching a content catalog for relevant metadata, including a search of the computed vector space for vectors that are similar or "close to" a vector computed for a set of one or more query terms or phonemes. The query engine 110 exhaustively computes a cosine value between the query vector and all other vectors in a space, and returns in a list those terms-phonemes and/or documents with the highest cosine values. Much like document vectors, a query vector is merely the sum of vectors for words or phonemes it contains, each weighted by the frequency in which they occur in the query (which for most ad hoc queries is just once). A query may consist of words or of phonemes. Its vector is computed with the weighted sum of either these word vectors or phoneme vectors derived from the computed LSI vector space. LSI is latent semantic indexing. It should be noted that a query vector may also be computed from all or part of a document such as in "relevance feedback." This is the case where a relevant document is submitted as a query to the query engine to find "more documents like this." Again, these may be either speech or text documents. The end user can select items on the hit list for retrieval from the content repository, since this list also delivers access descriptive metadata, e.g., a document's URL, stored in the catalog with content-descriptive metadata.

The algorithms and modeling described above are capable of being performed on an instruction execution system, apparatus, or device, such as a computing device 122, 124, 126. The algorithms themselves may be contained on a computer-readable medium that can be any means that can contain, store, communicate, propagate, or transport the program for use by or in connection with an instruction execution system, apparatus, or device, such as a computer.

While there has been described and illustrated a method and system of indexing, searching and retrieving speech documents, it will be apparent to those skilled in the art that variations and modifications are possible without deviating form the broad teachings and principles of the present invention which shall be limited solely by the scope of the claims appended hereto.

What is claimed is:

1. A method of cross media indexing, registering and retrieving speech documents, the method comprising:
   a computing device pre-processing a set of training documents, including at least creating training document metadata;
   the computing device constructing a terms-phonemes/document matrix from the training document metadata where rows are created for the terms and phonemes contained in the set of training documents and columns are created for each training document;
   the computing device normalizing entries in the terms-phonemes/document matrix;
   the computing device computing a vector space from the training documents by computing from the terms-phonemes/document matrix and storing the vector space in a catalog; and
   the computing device computing vectors for new documents and adding the vectors to the vector space without computing a new vector space in response to adding the vectors.

2. The method of claim 1, wherein creating training document metadata comprises creating a record for each document in the set of training documents, the metadata comprising at least one of document terms and phonemes counts, document type, creation date, or location.

3. The method of claim 1, wherein pre-processing comprises:
   the computing device transcribing phonetically speech documents in the set of training documents into an intermediate representative language, thereby creating phonetic transcriptions;
   the computing device converting the training documents from native format to UTF-8 format; and
   the computing device segmenting the training documents.

4. The method of claim 3, wherein segmenting comprises tokenizing the phonetic transcriptions and the converted documents to create counts for index terms and phonemes.

5. The method of claim 1, wherein computing a vector space comprises using a Singular Value Decomposition technique.

6. The method of claim 1, wherein computing vectors for new documents comprises creating a term-phoneme vector for each new document by summing weighted vectors for words and phonemes contained in each new document.

7. The method of claim 1 further comprising:
the computing device searching the vector space for vectors that are close to a vector computed for one or more query terms or phonemes; and
the computing device providing a list of documents associated with vectors in the vector space that are closest to the vector computed for the one or more query terms or phonemes.

8. The method of claim 7, wherein searching the vector space comprises:
computing a cosine value between a query vector and the vectors in the vector space; and
returning a list of documents having vectors with the highest cosine values.

9. An apparatus comprising:
a pre-processor configured to register a set of training documents, including creating metadata comprising at least document terms and phonemes counts;
a computing device configured to:
compute a terms-phonemes/document matrix from the metadata;
normalize the terms-phonemes/document matrix; and
compute a vector space from the normalized terms-phonemes/ document matrix;
the pre-processor further configured to compute vectors for new documents and to add the vectors to the vector space without computing a new vector space in response to adding the vectors to the vector space;
a query engine configured to search the vector space for vectors that are close to a vector computed for one or more query terms or phonemes; and
an interface configured to provide a list of documents associated with vectors in the vector space that are closest to the vector computed for the one or more query terms or phonemes.

10. The apparatus of claim 9, wherein the training document metadata for each training document further comprises at least one of document type, creation date, or location.

11. The apparatus of claim 9, wherein the pre-processor is further configured to:
phonetically transcribe speech documents in the set of training documents into an intermediate representative language, thereby creating phonetic transcriptions;
convert the set of training documents from native format to UTF-8 format; and
segment each document in the set of training documents.

12. The apparatus of claim 11, wherein the pre-processor configured to segment each document comprises the pre-processor configured to tokenize the phonetic transcriptions and the converted documents to create counts for index terms and phonemes.

13. The apparatus of claim 9, wherein the vectors for new documents comprise a summation of weighted vectors for words or phonemes contained in a new document.

14. The apparatus of claim 9, wherein the query engine is configured to compute a cosine value between a query vector and the vectors in the concept vector space, and
wherein the interface is configured to provide documents having vectors with the highest cosine values.

15. The apparatus of claim 9, wherein the computing device is configured to perform a singular value decomposition on the terms-phonemes/document matrix.

16. A tangible computer readable medium having instructions stored thereon, the instructions configured to cause a computing device to:
pre-process a set of training documents, including at least creating training document metadata;
construct a terms-phonemes/document matrix from the training document metadata where rows are created for the terms and phonemes contained in the set of training documents and a column is created for each training document;
normalize entries in the terms-phonemes/document matrix;
compute a vector space from the training documents by computing from the terms-phonemes/document matrix; and
compute vectors for new documents and adding the vectors to the vector space without computing a new vector space in response to adding the vectors.

17. The tangible computer readable medium of claim 16, wherein the instructions configured to cause the computing device to pre-process the set of training documents comprise instructions configured to cause the computing device to:
phonetically transcribe speech documents in the set of training documents into an intermediate representative language, thereby creating phonetic transcriptions;
convert the training documents from native format to UTF-8 format; and
segment each document in the set of training documents.

18. The tangible computer readable medium of claim 17, wherein the instructions configured to cause the computing device to segment each document in the set of training documents comprise instructions configured to cause the computing device to tokenize the phonetic transcriptions and the converted documents to create counts for index terms and phonemes.

19. The tangible computer readable medium of claim 16, wherein the instructions configured to cause the computing device to compute vectors for new documents comprise instructions configured to cause the computing device to create a term-phoneme vector for each new document by summing weighted vectors for words and phonemes contained in each new document.

20. The tangible computer readable medium of claim 16, wherein the instructions are further configured to cause the computing device to:
search the vector space for vectors that are close to a vector computed for one or more query terms or phonemes; and
provide a list of documents associated with vectors in the vector space that are closest to the vector computed for the one or more query terms or phonemes.

21. The tangible computer readable medium of claim 20, wherein the instructions configured to cause the computing device to search the vector space for vectors that are close to a vector computed for one or more query terms or phonemes comprise instructions configured to cause the computing device to:
compute a cosine value between the vector computed for the one or more query terms or phonemes and the vectors in the vector space; and
return a list of documents having vectors with the highest cosine values.

22. An apparatus comprising:
a memory;
a processor device in communication with the memory and configured, in combination with the memory, to:
pre-process a set of training documents, including at least creating training document metadata;
construct a terms-phonemes/document matrix from the training document metadata where rows are created for the terms and phonemes contained in the set of training documents and columns are created for each training document;

normalize entries in the terms-phonemes/document matrix;

compute a vector space from the training documents by computing from the terms-phonemes/document matrix; and compute vectors for new documents and adding the vectors to the vector space without computing a new vector space in response to adding the vectors.

23. The apparatus of claim 22, wherein the training document metadata for each training document further comprises at least one of document terms and phonemes counts, document type, creation date, or location.

24. The apparatus of claim 22, wherein the vectors for new documents comprise a summation of weighted vectors for words or phonemes contained in each new document.

25. The apparatus of claim 22, wherein the processor device is further configured to:

search the vector space for vectors that are close to a vector computed for one or more query terms or phonemes; and provide a list of documents associated with vectors in the vector space that are closest to the vector computed for the one or more query terms or phonemes.

26. A method comprising:

a computing device pre-processing a set of training documents, including at least tokenizing the set of training documents to create counts for index terms and phonemes;

the computing device constructing a terms-phonemes/document matrix from the counts;

the computing device normalizing entries in the terms-phonemes/document matrix;

the computing device computing a vector space from the normalized terms-phonemes/document matrix;

the computing device computing vectors for new documents and adding the vectors to the vector space.

27. The method of claim 26, wherein pre-processing comprises:

the computing device transcribing phonetically any speech documents in the set of training documents into an intermediate representative language, thereby creating phonetic transcriptions;

the computing device converting the set of training documents from native format to UTF-8 format; and wherein the computing device tokenizing the set of training documents comprises the computing device tokenizing the transcribed and converted documents.

28. The method of claim 26, wherein computing vectors for new documents comprises creating a term-phoneme vector for each new document by summing weighted vectors for words and phonemes contained in each new document.

29. The method of claim 26, further comprising:

the computing device searching the vector space for vectors that are close to a vector computed for one or more query terms or phonemes; and the computing device providing a list of documents associated with vectors in the vector space that are closest to the vector computed for the one or more query terms or phonemes.

30. The method of claim 29, wherein searching the vector space comprises:

the computing device computing a cosine value between a query vector and the vectors in the vector space; and the computing device returning a list of documents having vectors with the highest cosine values.

31. An apparatus for cross media indexing, registering, and retrieving speech documents, the apparatus comprising:

an interface configured to receive a set of documents;

a pre-processor configured to transcribe the set of documents and tokenize the transcriptions to create counts for index terms and phonemes;

a computing device configured to compute a term-phoneme/document matrix, normalize the term-phoneme/document matrix, and compute a vector space from the normalized term-phoneme/document matrix;

a database configured to store the vector space and the counts;

a query engine configured to search the vector space for documents closest to a query vector.

32. The apparatus of claim 31, wherein the interface is further configured to receive one or more new documents and wherein the computing device is further configured to add vectors of the one or more new documents to the vector space.

* * * * *